(12) United States Patent
Hiramoto et al.

(10) Patent No.: US 8,902,338 B2
(45) Date of Patent: Dec. 2, 2014

(54) COLOR SEPARATION FILTER ARRAY, SOLID-STATE IMAGING ELEMENT, IMAGING DEVICE, AND DISPLAY DEVICE

(75) Inventors: Masao Hiramoto, Osaka (JP); Masayuki Misaki, Hyogo (JP); Masaaki Suzuki, Osaka (JP)

(73) Assignee: Panasonic Intellectual Property Corporation of America, Torrance, CA (US)

( * ) Notice: Subject to any disclaimer, the term of this patent is extended or adjusted under 35 U.S.C. 154(b) by 48 days.

(21) Appl. No.: 13/814,260

(22) PCT Filed: May 25, 2012

(86) PCT No.: PCT/JP2012/003427
§ 371 (c)(1),
(2), (4) Date: Feb. 5, 2013

(87) PCT Pub. No.: WO2012/169136
PCT Pub. Date: Dec. 13, 2012

(65) Prior Publication Data
US 2013/0135502 A1 May 30, 2013

(30) Foreign Application Priority Data

Jun. 6, 2011 (JP) ................. 2011-126150

(51) Int. Cl.
| | |
|---|---|
| *H04N 3/14* | (2006.01) |
| *H04N 9/04* | (2006.01) |
| *G02B 27/10* | (2006.01) |
| *G02B 27/14* | (2006.01) |

(52) U.S. Cl.
CPC ............ *H04N 9/045* (2013.01); *G02B 27/1006* (2013.01); *G02B 27/141* (2013.01); *G02B 27/143* (2013.01)
USPC ........................................... 348/272; 348/294

(58) Field of Classification Search
USPC .................................................. 348/272–281
See application file for complete search history.

(56) References Cited

U.S. PATENT DOCUMENTS 7,110,034 B2 * 9/2006 Suda ............................ 348/340
7,245,324 B2 * 7/2007 Namazue et al. ............. 348/340
(Continued)

FOREIGN PATENT DOCUMENTS

| JP | 52-082018 A | 7/1977 |
|---|---|---|
| JP | 59-090467 A | 5/1984 |

(Continued)

OTHER PUBLICATIONS

International Search Report for corresponding International Application No. PCT/JP2012/003427 mailed Aug. 7, 2012.

*Primary Examiner* — Tuan Ho
*Assistant Examiner* — Selam Gebriel
(74) *Attorney, Agent, or Firm* — Renner, Otto, Boisselle & Sklar, LLP

(57) ABSTRACT

A color separating filter array has a configuration in which unit elements 1, each having a triangular pyramid shape, are arranged two-dimensionally. Each unit element 1 includes: first, second, and third filters 1R, 1G, 1B arranged to form the three lateral faces of the triangular pyramid; and a reflective region. The first, second and third filters 1R, 1G and 1B are designed to transmit visible radiations falling within first, second and third wavelength ranges, respectively, and reflect visible radiation falling within any other wavelength range. The reflective region is arranged to further reflect a light ray that has been incident on a region surrounded with the first, second and third filters and reflected from any of the first, second and third filters and to guide the reflected light ray to another one of the first, second and third filters that is different from the one that has already reflected the light ray once.

10 Claims, 8 Drawing Sheets

(56) References Cited

U.S. PATENT DOCUMENTS

| | | | |
|---|---|---|---|
| 2003/0063204 A1* | 4/2003 | Suda | 348/272 |
| 2003/0179457 A1* | 9/2003 | Dobashi et al. | 359/619 |
| 2006/0016558 A1* | 1/2006 | Park | 156/345.25 |
| 2010/0225781 A1* | 9/2010 | Kanemitsu et al. | 348/223.1 |
| 2010/0277801 A1 | 11/2010 | Nakajima | |
| 2012/0261731 A1* | 10/2012 | Yu | 257/292 |

FOREIGN PATENT DOCUMENTS

| | | |
|---|---|---|
| JP | 63-307401 A | 12/1988 |
| JP | 06-006646 A | 1/1994 |
| JP | 09-015626 A | 1/1997 |
| JP | 11-109281 A | 4/1999 |
| JP | 2000-151933 | 5/2000 |
| JP | 2003-078917 A | 3/2003 |
| JP | 2007-010893 A | 1/2007 |

* cited by examiner (CROSS SECTION C-C')

COLOR SEPARATION FILTER ARRAY, SOLID-STATE IMAGING ELEMENT, IMAGING DEVICE, AND DISPLAY DEVICE

TECHNICAL FIELD

The present application relates to a technique for increasing the sensitivity of a color image capture device and that of a color display device.

BACKGROUND ART

Recently, the performance and functionality of digital cameras and digital movie cameras that use some solid-state image sensor such as a CCD and a CMOS (which will be sometimes simply referred to herein as an "image sensor") have been enhanced to an astonishing degree. In particular, the size of a pixel structure for use in an image sensor has been further reduced these days thanks to rapid development of semiconductor device processing technologies, thus getting an even greater number of pixels and drivers integrated together in an image sensor. As a result, the resolution of an image sensor has lately increased significantly from about one million pixels to ten million or more pixels in a matter of few years. Meanwhile, the greater the number of pixels in an image sensor, the lower the intensity of the light falling on a single pixel (which will be referred to herein as a "light intensity") and the lower the sensitivity of the camera tends to be.

On top of that, in a normal color camera, a subtractive color filter that uses an organic pigment as a dye is arranged over each photosensing section of an image sensor, and therefore, the optical efficiency achieved is rather low. In a Bayer color filter, which uses a combination of one red (R) pixel, two green (G) pixels and one blue (B) pixel as a fundamental unit, each color filter transmits a light ray with only one color component and absorbs a light ray with any other color component. Specifically, the R filter transmits an R ray but absorbs G and B rays, the G filter transmits a G ray but absorbs R and B rays, and the B filter transmits a B ray but absorbs R and G rays. That is to say, each color filter transmits only one of the three colors of R, G and B and absorbs the other two colors. Consequently, the light ray that can be used is only approximately one third of the visible radiation falling on each color filter.

To overcome such a decreased sensitivity problem, Patent Document No. 1 discloses a method for increasing the quantity of the light received by attaching an array of micro lenses to a photodetector section of an image sensor. According to this technique, the incoming light is condensed with those micro lenses, thereby substantially increasing the optical aperture ratio. And this technique is now used in almost all solid-state image sensors. It is true that the aperture ratio can be increased substantially by this technique but the decrease in optical efficiency by color filters still persists.

Thus, to avoid the decrease in optical efficiency and the decrease in sensitivity at the same time, Patent Document No. 2 discloses an image sensor for taking in as much incoming light as possible by using multilayer filters and micro lenses in combination. Such an image sensor includes a combination of multilayer filters, each of which does not absorb light but selectively transmits only a component of light falling within a particular wavelength range and reflects the rest of the light falling within the other wavelength ranges. Each filter makes only a required component of the incoming light selectively incident on its associated photosensing section and reflects the other light rays.

FIG. 7 is a schematic cross-sectional view of the image sensor disclosed in Patent Document No. 2. In the image sensor shown in FIG. 7, the light that has impinged on a condensing micro lens 11 has its luminous flux adjusted by an inner lens 12, and then enters a filter 13, which is designed to transmit an R ray but reflect rays of the other colors. The light ray that has been transmitted through the filter 13 is then incident on a photosensitive cell 23 that is located right under the filter 13. On the other hand, the light ray that has been reflected from the filter 13 enters the adjacent filter 14, which is designed to reflect a G ray but transmit rays of the other colors. The G ray that has been reflected from the filter 14 is incident on a photosensitive cell 24 that is located right under the filter 14. On the other hand, the B ray that has been transmitted through the filter 14 is reflected from the filter 15 and then incident on a photosensitive cell 25 that is located right under the filter 15. In this manner, the visible radiation that has impinged on the condensing micro lens 11 is not lost but their RGB components can be detected by the three photosensitive cells non-wastefully. Such an image sensor can certainly condense the incoming light effectively through the micro lenses but needs to have pixels in the three colors of RGB, thus requiring a high density device structure.

The principle of color separation disclosed in Patent Document No. 2 is the same as that of the two- and three-tube color cameras that use splitting the incoming light through the multilayer filters and total reflection at the interface as disclosed in Patent Documents Nos. 3 and 4, respectively. FIGS. 8A and 8B illustrate optical prisms for use in the two- and three-tube color cameras disclosed in Patent Documents Nos. 3 and 4, respectively. The prism 21 shown in FIG. 8A separates R and B rays from a G ray. On the other hand, the prism 22 shown in FIG. 8B separates the R, G and B rays from each other. In the multi-panel color cameras disclosed in Patent Documents Nos. 3 and 4, information about the respective colors is received on an image basis. On the other hand, in the device disclosed in Patent Document No. 2, information about the respective colors is received on a pixel basis. In any case, pixels in the three colors are needed.

Thus, to overcome such problems with the related art, Patent Document No. 5 discloses a technique for increasing the optical efficiency by using multilayer filters and reflected light, although some loss of the incoming light is involved. FIG. 9 is a partial cross-sectional view of an image sensor that adopts such a technique. As shown in FIG. 9, multilayer filters 32 and 33 are embedded in a light-transmitting resin 31. Specifically, the multilayer filter 32 transmits a G ray and reflects R and B rays, while the multilayer filter 33 transmits an R ray and reflects G and B rays.

Such a structure cannot receive a B ray at its photosensing section but can sense R and G rays entirely under the following principle. First, if an R ray impinges on the multilayer filters 32 and 33, the R ray is reflected from the multilayer filter 32, is totally reflected from the interface between the light-transmitting resin 31 and the air, and then strikes the multilayer filter 33. Then, almost all of the R ray that has impinged on the multilayer filter 33 will be incident on the photosensing section by way of the organic dye filter 35 and the micro lens 36 that transmit the R ray, even though only a part of the light is reflected from the metal layer 37. On the other hand, if a G ray impinges on the multilayer filters 32 and 33, the G ray is reflected from the multilayer filter 33, is totally reflected from the interface between the light-transmitting resin 31 and the air, and then strikes the multilayer filter 32. Then, almost all of the G ray that has impinged on the multilayer filter 32 will eventually be incident on the photosensing section with virtually no loss by way of the organic dye filter 34 and the micro lens 36 that transmit the G ray.

According to the technique disclosed in Patent Document No. 5, only one of the three colors of RGB is lost but light rays of the other two colors can be received with almost no loss based on the principle described above. That is why there is no need to provide photosensing sections for all of the three colors of RGB. In this case, compared to an image sensor that uses only organic dye filters, it can be seen that the optical efficiency can be doubled by this technique. Nevertheless, even if such a technique is adopted, one out of the three colors should still be sacrificed.

The problem described above is a problem with a color image capturing system. However, a color display system also has a similar problem. Since a color liquid crystal display device of today uses RGB organic dye filters, only approximately one third of the incoming light can be used and the other two thirds should be lost.

CITATION LIST

Patent Literature

Patent Document No. 1: Japanese Laid-Open Patent Publication No. 59-90467
Patent Document No. 2: Japanese Laid-Open Patent Publication No. 2000-151933
Patent Document No. 3: Japanese Laid-Open Patent Publication No. 52-82018
Patent Document No. 4: Japanese Laid-Open Patent Publication No. 6-6646
Patent Document No. 5: Japanese Laid-Open Patent Publication No. 2003-78917

SUMMARY OF INVENTION

Technical Problem

According to the traditional technologies for color image capturing systems and color display systems that use light-absorbing color filters, the number of photosensitive cells to provide does not have to be increased significantly but the optical efficiency achieved will be low. Nevertheless, if color filters of a multilayer type are used, then the optical efficiency will be high but the number of photosensitive cells to provide should be increased considerably.

Thus, an embodiment of the present invention provides a novel color separating filter which contributes to realizing a color image capture device and color display device with high optical efficiency by using a filter that selectively transmits a light ray falling within a particular wavelength range and that reflects a light ray falling within any other wavelength range.

Solution to Problem

To overcome the problem described above, in a color separating filter array according to an aspect of the present invention, a plurality of unit elements, each having the shape of a triangular pyramid, are arranged two-dimensionally. Each unit element includes: first, second, and third filters that are arranged to form the three lateral faces of the triangular pyramid and that have mutually different transmission wavelength ranges and reflection wavelength ranges; and reflective region that is arranged to further reflect a light ray that has been incident on a region surrounded with the first, second and third filters and reflected from any of the first, second and third filters and to guide the reflected light ray to another one of the first, second and third filters that is different from the one that has already reflected the light ray once. The first filter is designed to transmit visible radiation falling within a first wavelength range and reflect visible radiation falling within any wavelength range other than the first wavelength range. The second filter is designed to transmit visible radiation falling within a second wavelength range and reflect visible radiation falling within any wavelength range other than the second wavelength range. And the third filter is designed to transmit visible radiation falling within a third wavelength range and reflect visible radiation falling within any wavelength range other than the third wavelength range.

Advantageous Effects of Invention

According to an embodiment of the present invention, the loss can be cut down for each of the color components of the incoming light. As a result, an image capturing system with higher sensitivity or a display system with higher luminance than known ones is realized even without significantly increasing the number of photosensitive cells to provide.

DESCRIPTION OF EMBODIMENTS

Figure 1A:
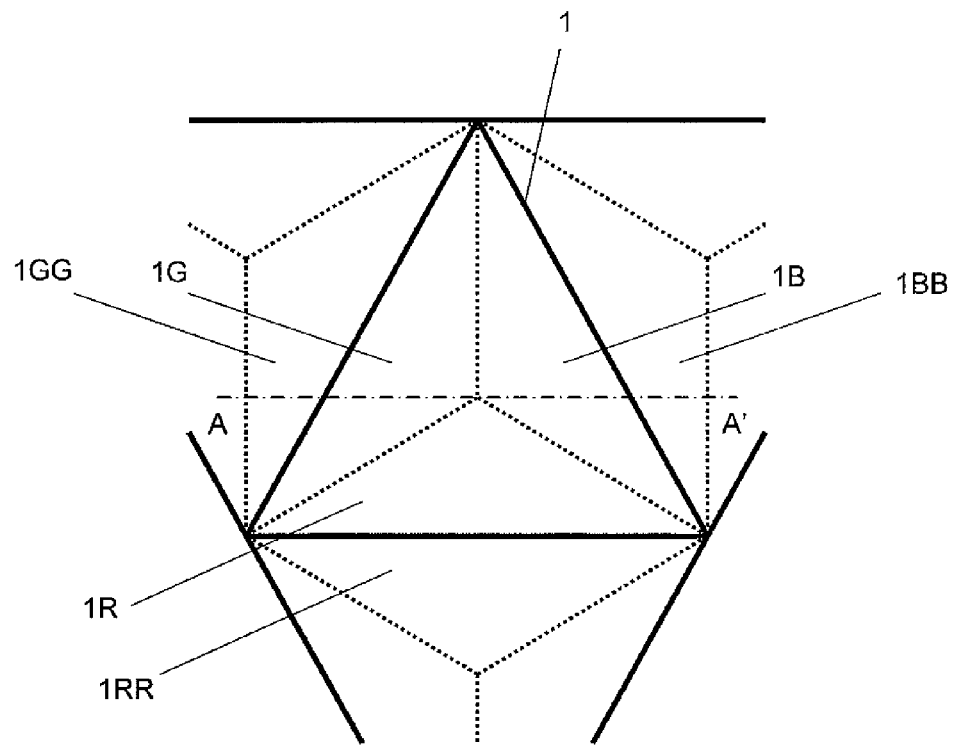
FIG. 1A A plan view illustrating a color separating filter according to a first exemplary embodiment.

Exemplary embodiments of the present invention are outlined as follows:

(1) In a color separating filter array according to an aspect of the present invention, a plurality of unit elements, each having the shape of a triangular pyramid, are arranged two-dimensionally. Each unit element includes: first, second, and third filters that are arranged to form the three lateral faces of the triangular pyramid and that have mutually different transmission wavelength ranges and reflection wavelength ranges; and a reflective region that is arranged to further reflect a light ray that has been incident on a region surrounded with the first, second and third filters and reflected from any of the first, second and third filters and to guide the reflected light ray to another one of the first, second and third filters that is different from the one that has already reflected the light ray once. The first filter is designed to transmit visible radiation falling within a first wavelength range and reflect visible radiation falling within any wavelength range other than the first wavelength range. The second filter is designed to transmit visible radiation falling within a second wavelength range and reflect visible radiation falling within any wavelength range other than the second wavelength range. And the third filter is designed to transmit visible radiation falling within a third wavelength range and reflect visible radiation falling within any wavelength range other than the third wavelength range.

(2) In one embodiment, the reflective region is arranged so as to totally reflect the light ray that has been reflected from any of the first, second and third filters.

(3) In one embodiment of the color separating filter array of (1) or (2), the first wavelength range is the color red wavelength range, the second wavelength range is the color green wavelength range, and the third wavelength range is the color blue wavelength range.

(4) In one embodiment of the color separating filter array of one of (1) to (3), the reflective region and the first, second, and third filters are arranged so that part of the light ray that has been transmitted through the reflective region and then reflected from any of the first, second and third filters is reflected from the reflective region, further reflected from a different one of the first, second and third filter other than the filter that has already reflected the light ray, once again reflected from the reflective region, and then incident on one of the first, second and third filters that has the property of transmitting the light ray.

(5) In one embodiment of the color separating filter array of one of (1) to (4), if the refractive index of a medium that is surrounded with the first, second and third filters and the reflective region with respect to another medium that contacts with the former medium via the reflective region is n and if the angle defined by each of the first, second and third filters with respect to the reflective region is w, the filter array satisfies at least one of the three inequalities:

$$\frac{1}{2}\sin^{-1}\left(\frac{1}{n}\right) < w, \ w < \tan^{-1}\left(\frac{1}{\sqrt{2}}\right), \text{ and } w < \sin^{-1}\left(\left(\frac{\sqrt{n^2-1}}{n}\right)^{\frac{1}{4}}\right).$$

(6) In one embodiment of the color separating filter array of (5), the filter array satisfies all of the three inequalities:

$$\frac{1}{2}\sin^{-1}\left(\frac{1}{n}\right) < w, \ w < \tan^{-1}\left(\frac{1}{\sqrt{2}}\right), \text{ and } w < \sin^{-1}\left(\left(\frac{\sqrt{n^2-1}}{n}\right)^{\frac{1}{4}}\right).$$

(7) In one embodiment of the color separating filter array of one of (1) to (6), the plurality of unit elements are arranged so that the first, second and third filters of each unit element are respectively adjacent to the first, second and third filters of an adjacent one of the unit elements.

(8) A solid-state image sensor as an embodiment of the present invention includes: the color separating filter array of one of (1) to (7); and a plurality of photosensitive cells that are arranged opposite from the reflective region with respect to the first, second and third filters of each unit element.

(9) An image capture device as an embodiment of the present invention includes: the solid-state image sensor of (8); an optical system that produces an image on an image capturing plane of the solid-state image sensor; and a signal processing section that processes the output signal of the solid-state image sensor.

(10) A display device as an embodiment of the present invention includes: the color separating filter array of one of (1) to (7); and a plurality of display sections that are arranged opposite from the reflective region with respect to the first, second and third filters of each unit element.

Hereinafter, embodiments of the present invention will be described with reference to the accompanying drawings. In the following description, any pair of components shown in multiple drawings and having substantially the same function will be identified by the same reference numeral.

Embodiment 1

First of all, a first embodiment of the present invention will be described. This embodiment relates to an image sensor with a color separating filter array.

FIG. 1A is a plan view illustrating the fundamental configuration of a color separating filter array according to this embodiment. The color separating filter array of this embodiment uses a triangular pyramid unit element 1, which is illustrated as an equilateral triangle in FIG. 1A, as a fundamental unit, and has a structure in which a number of such unit elements 1 are arranged two-dimensionally. Each unit element 1 has three filters 1R, 1G and 1B, which are arranged to form the three lateral faces of the triangular pyramid. FIG. 1A illustrates a part of the color separating filter array, which is viewed from over the bottom of the triangular pyramid opposite to its apex. In FIG. 1A, the borders between the filters 1R, 1G and 1B are indicated by the dashed lines or solid lines.

Unlike normal light absorbing filters, each of the filters 1R, 1G and 1B of this embodiment has the property of transmitting visible radiation falling within a particular wavelength range and reflecting visible radiation falling within any other wavelength range. Specifically, the filter 1R is designed to transmit a light ray falling within the color red (R) wavelength range and reflect a light ray falling within the color cyan (Cy) wavelength range. The filter 1G is designed to transmit a light ray falling within the color green (G) wavelength range and reflect a light ray falling within the color magenta (Mg) wavelength range. And the filter 1B is designed to transmit a light ray falling within the color blue (B) wavelength range and reflect a light ray falling within the color yellow (Ye) wavelength range. In this case, the Cy wavelength range covers the G and B wavelength ranges, the Mg wavelength range covers the B and R wavelength ranges, and the Ye wavelength range covers the R and G wavelength ranges.

Each of these filters 1R, 1G and 1B may be made of a multilayer dielectric film, for example By using a multilayer dielectric film, a filter that selectively transmits or reflects a light ray falling within a target wavelength range can be made. It should be noted that these filters 1R, 1G and 1B do not have to be implemented as a multilayer dielectric film but may also be a hologram as long as the filters have such a property.

As shown in FIG. 1A, each single unit element 1 is adjacent to three other unit elements, and those unit elements are arranged so that two filters with the same property are adjacent to each other. That is to say, the filter 1R is adjacent to the filter 1RR of an adjacent unit element, the filter 1G is adjacent to the filter 1GG of another adjacent unit element, and the filter 1B is adjacent to the filter 1BB of still another adjacent unit element. These filters 1RR, 1GG and 1BB have the same properties as the filters 1R, 1G and 1B, respectively.

Figure 1B:
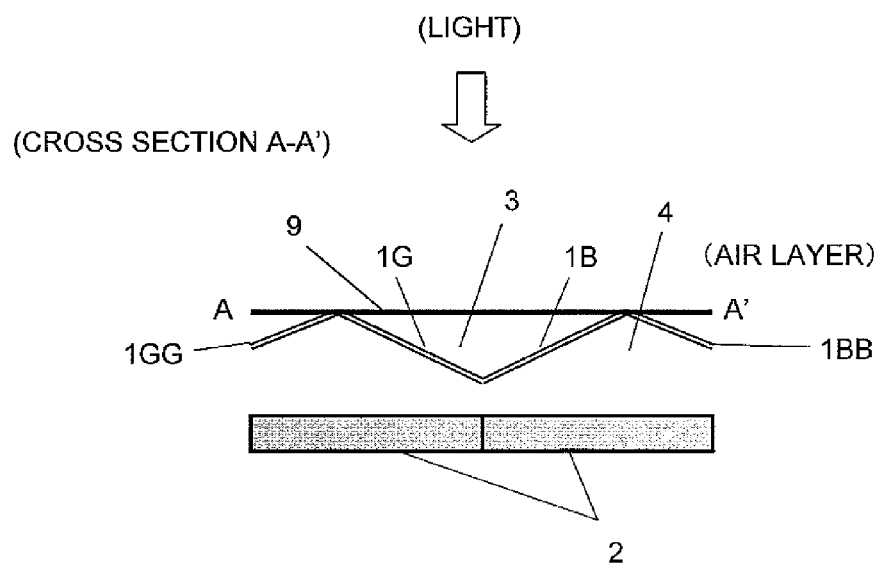
FIG. 1B A cross-sectional view of the color separating filter of the first exemplary embodiment as viewed on the plane A-A'.

FIG. 1B is a cross-sectional view as viewed on the plane A-A' shown in FIG. 1A. In this embodiment, every filter 1R, 1G, 1B forms the same tilt angle with respect to a horizontal plane. In this description, the "horizontal plane" refers herein to a plane that includes the bottom of the triangular pyramid formed by these filters 1R, 1G and 1B, no matter what direction the plane actually faces.

Two filters with the same property (i.e., 1R and 1RR, 1G and 1GG, and 1B and 1BB) form a pair. And photosensitive cells 2 are arranged right under those filters. That is why those photosensitive cells 2, as well as the filters, have a diamond shape. Each of those photosensitive cells 2 typically includes a photodiode and outputs a photoelectrically converted signal representing the intensity of the light received.

The inside of each unit element 1 is filled with a first transparent medium 3 with a refractive index n1. The first transparent medium 3 contacts with the external air layer via an interface 9. In this embodiment, the interface 9 functions as a reflective region as will be described later. In addition, the gap between the color separating filter array and the photosensitive cells 2 is filled with a second transparent medium 4 with a refractive index n2. The first and second transparent media 3 and 4 may be any members as long as those media are transparent members with a higher refractive index than the external air layer.

Hereinafter, it will be described what the light that has been incident on the color separating filter array of this embodiment will come out. In the example to be described below, white light (W light) is supposed to be incident perpendicularly (i.e., downward on the paper on which FIG. 1B is drawn) on the color separating filter array through the air layer (with a refractive index of 1.0). Also, both of the first and second transparent media are supposed to have the same refractive index n (i.e., n1=n2=n).

Figure 2A:
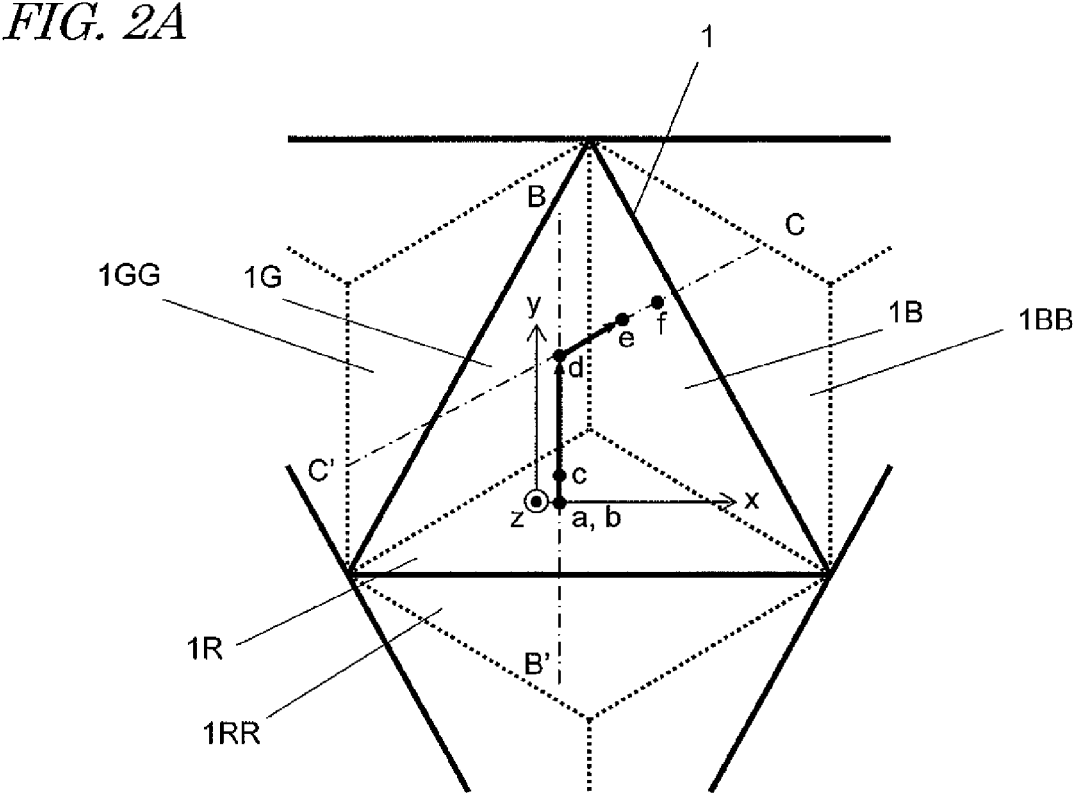
FIG. 2A A plan view illustrating a color separating filter according to the first exemplary embodiment.
Figure 2B:
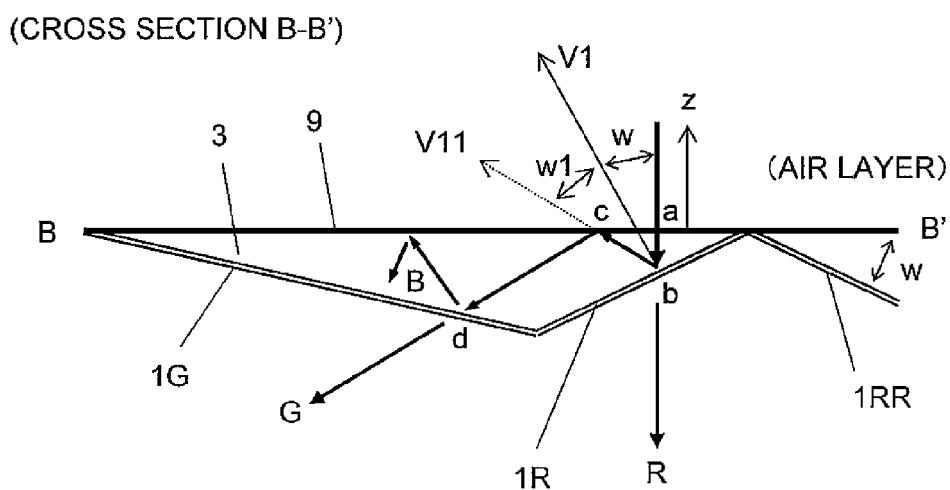
FIG. 2B A cross-sectional view of the color separating filter of the first exemplary embodiment as viewed on the plane B-B'.
Figure 2C:
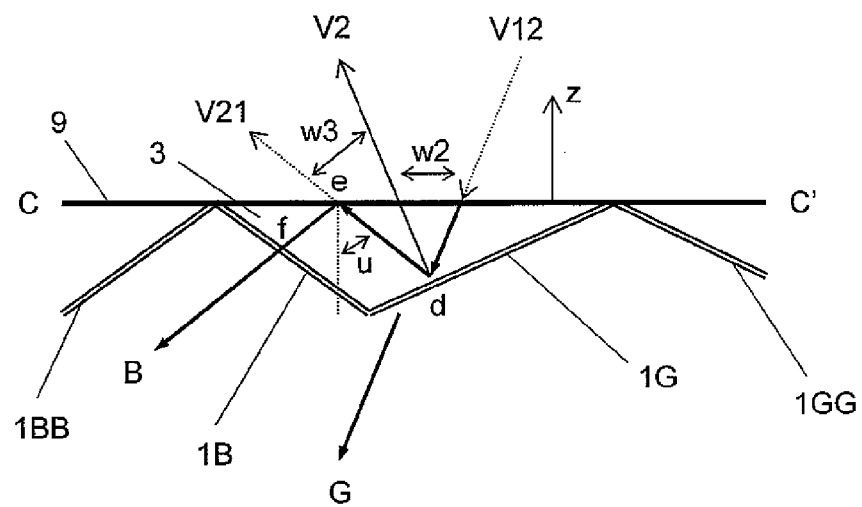
FIG. 2C A cross-sectional view of the color separating filter of the first exemplary embodiment as viewed on the plane C-C'.

FIG. 2A is a plan view showing the path of a single light ray that has been virtually incident on the color separating filter array shown in FIG. 1A. FIG. 2B and 2C are cross-sectional views thereof as respectively viewed on the planes B-B' and C-C' shown in FIG. 2A. Hereinafter, it will be described with reference to FIGS. 2A through 2C what path a light ray that has been incident perpendicularly on the color separating filter array at the point a shown in FIG. 2A will follow as a typical exemplary path of a incoming light ray. In this case, the x- and y-axes are defined on a plane that intersects with the light incoming direction at right angles, and the z-axis is defined to be the opposite direction to the light incoming direction, with the point a used as the origin.

If the incoming light is incident perpendicularly on the point a shown in FIG. 2A, an R ray is transmitted through the point b on the filter 1R but a Cy ray (i.e., a combination of G and B rays) is reflected from the point b. The R ray that has been transmitted through the point b is incident on the photosensitive cell 2 that is located right under the filter 1R. Hereinafter, it will be described where the Cy ray that has been reflected from the point b will go.

As described above, every filter defines the same tilt angle with respect to the horizontal plane (i.e., the xy plane). That tilt angle will be identified herein by w. Then, the unit normal vector V1 that intersects with the plane of the filter 1R at right angles is represented by the following Equation (1):

$$V1=(0, \sin(w), \cos(w)) \quad (1)$$

If the angle of reflection from the filter 1R is identified by w1, then w1==w is satisfied because the angle of reflection is equal to the angle of incidence. That is why the direction of the reflected light agrees with the direction of the unit vector V11 given by the following Equation (2):

$$V11=(0, \sin(2w), \cos(2w)) \quad (2)$$

The light reflected from the filter 1R is further reflected from the point c on the interface 9 between the first transparent medium 3 and the air layer as shown in FIG. 2B. In this embodiment, the tilt angle w of each filter is supposed to be set so that the reflected light is totally reflected from the interface 9 in order to increase the optical efficiency. That is to say, w is set so as to satisfy the following Inequality (3) so that the angle of incidence 2w on the interface 9 becomes equal to or greater than a critical angle:

$$w > \tfrac{1}{2} \sin^{-1}(1/n) \quad (3)$$

However, there is another condition to satisfy besides this Inequality (3). That is the light reflected from the filter 1R should not be incident directly on the filter 1G. The reason is that if the light reflected from the filter 1R were incident directly on the filter 1G, then the light would be retro-reflected (i.e., would go upward) to the direction in which the z coordinate increases. In addition, in that case, the light transmitted through the filter 1G would highly likely travel horizontally (i.e., in the direction in which the y coordinate increases). That is to say, the optical efficiency could decrease in that case. To avoid such a situation, the tilt angle of the vector V11 should be greater than that of the filter 1G. This condition is represented by the following Inequality (4):

$$\frac{\cos(2w)}{\sin(2w)} > \frac{\cos(\tfrac{\pi}{3})\sin(w)}{\cos(w)} \quad (4)$$

In this Inequality (4), the left side is the ratio of the z component to the y component of the vector V11 and the right side represents the tilt of the filter 1G (i.e., the ratio of the −y component to the z component in Equation (8) to be described later). In this case, if $2w<\pi/2$, then Inequality (4) is further modified into the following Inequality (5). As a result, Inequality (6) is obtained. When represented by an angle, Inequality (6) will be w<35.3 degrees.

$$2 > \tan(2w)\tan(w) = \frac{2\tan^2 w}{1 - \tan^2 w} \quad (5)$$

$$w < \tan^{-1}\left(\frac{1}{\sqrt{2}}\right) \quad (6)$$

As can be seen from the foregoing description, in the W light that has been transmitted through the point a, only the R ray is transmitted through the point b and then incident on the photosensitive cell 2 that is located right under the filter 1R. Meanwhile, the other Cy ray is reflected from the filter 1R, further reflected from the point c on the interface 9 between the first transparent medium 3 and the air layer, and then incident on the filter 1G.

Next, it will be described what path the light incident on the filter 1G will follow.

As shown in FIG. 2C, in the Cy ray incident on the filter 1G, only the G ray is transmitted through the point d on the filter 1G and incident on the photosensitive cell that is located right under the filter 1G. On the other hand, the B ray included in the Cy ray is reflected from the point d on the filter 1G. Since the first and second transparent media 3 and 4 have the same refractive index according to this embodiment, the traveling direction of the light does not change before and after the light is transmitted through the filter 1G. To make the G ray transmitted incident on the photosensitive cell as perfectly perpendicularly as possible, the refractive indices n1 and n2 of the first and second transparent media n1 and n2 may be set so as to satisfy n1<n2.

The traveling direction of the Cy ray incident on the filter 1G is obtained just by turning the Z coordinate of the vector V11 into a negative one, and therefore, agrees with the direction of the unit vector V12 represented by the following Equation (7):

$$V12=(0, \sin(2w), -\cos(2w)) \quad (7)$$

Since each unit element of the color separating filter array has a regular triangular pyramid shape and since every filter defines the same tilt angle w with respect to the horizontal plane, the unit normal vector V2 that intersects with the plane of the filter 1G at right angles is represented by the following Equation (8):

$$V2=(\sin(w)\sin(\pi/3), -\sin(w)\cos(\pi/3), \cos(w)) \quad (8)$$

The angle of incidence w2 of the Cy ray on the filter 1G can be modified as in the following Equations (10) and (11) using the inner product of the vectors V12 and V2 represented by the following Equation (9), and is eventually given by the following Equation (12):

$$\cos(\pi - w2) = -\sin(2w)\sin(w)\cos\left(\frac{\pi}{3}\right) - \cos(2w)\cos(w) \quad (9)$$

$$= \frac{1}{4}\{\cos(3w) - \cos(w)\} - \frac{1}{2}\{\cos(3w) + \cos(w)\}$$

$$= -\frac{1}{4}\{\cos(3w) + 3\cos(w)\}$$

$$-\cos(w2) = -\frac{1}{4}\{\cos(3w) + 3\cos(w)\} \quad (10)$$

$$\cos(w2) = \frac{1}{4}\{\cos(3w) + 3\cos(w)\} = \cos^3(w) \quad (11)$$

$$w2 = \cos^{-1}(\cos^3(w)) \quad (12)$$

The traveling direction of the B ray reflected from the point d on the filter 1G defines an angle w3 (=w2) with respect to a normal V2 to the plane of the filter 1G and is the same as the direction of the unit vector V21 given by the following Equation (13), in which the k value is represented by the following Equation (17) based on the results of calculations by the following Equations (14) to (16):

$$V21=k \cdot V2+V12 \quad (13)$$

$$V21 \cdot V21=(k \cdot V2+V12)(k \cdot V2+V12) \quad (14)$$

$$1=k^2+k \cdot V2 \cdot V12+1 \quad (15)$$

$$k=-V2 \cdot V12 \quad (16)$$

$$k=\tfrac{1}{4}(\cos(3w)+3\cos(w))=\cos^3(w) \quad (17)$$

The B ray reflected from the point d on the filter 1G is further reflected from the interface 9 between the first transparent medium 3 and the air layer. In this case, the tilt angle w of each filter is also set so that the light ray is totally reflected from the interface 9 in order to increase the optical efficiency. If the angle of incidence of the B ray on the point e on the interface 9 is identified by u, then the following Equation (18) is satisfied because the cosine value of the angle of incidence u agrees with the z value of the vector V21. And Equation (18) can be further modified into the following Equation (19):

$$\cos(u)=k \cdot \cos(w)-\cos(2w) \quad (18)$$

$$\cos(u)=\cos^4(w)-(2\cos^2(w)-1)=(1-\cos^2(w))^2=\sin^4(w) \quad (19)$$

To totally reflect the B ray from the point e on the interface 9, its angle of incidence u should be equal to or greater than the critical angle. That is to say, the total reflection is produced when cos(u) satisfies the following Inequality (20):

$$\cos(u) < \frac{\sqrt{n^2-1}}{n} \quad (20)$$

As can be seen from Equation (19) and Inequality (20), to produce the total reflection from the point e, the tilt angle w of the filter needs to be set so as to satisfy the following Inequality (21):

$$w < \sin^{-1}\left(\left(\frac{\sqrt{n^2-1}}{n}\right)^{1/4}\right) \quad (21)$$

As can be seen from the foregoing description, in the Cy ray incident on the point d on the filter 1G, only the G ray is transmitted through the point d and incident on the photosensitive cell 2 under the filter 1G. The other B ray is reflected from the filter 1G, and if the angle w is set to be an appropriate value, is further totally reflected from the point e on the interface 9 with the air layer. After that, the B ray is incident on the point f on the filter 1B and then incident on the photosensitive cell 2 under the filter 1B.

In the foregoing description, it has been described what path the light ray incident on the point a on the filter 1R will follow. However, the same statement applies even if the incoming light ray is incident on the filter 1G or the filter 1B. That is to say, in any case, the loss of the incoming light can be minimized and the incoming light can be split into light rays with RGB components and can be photoelectrically converted by the respective photosensitive cells 2 highly efficiently. Particularly, in this embodiment, filters 1R and 1RR, 1G and 1GG, and 1B and 1BB are paired and diamond shaped photosensitive cells 2 are arranged right under those pairs of filters. That is why even if the light is obliquely transmitted through any of these filters, the light can still be easily absorbed into the photosensitive cell 2 right under the filter.

As can be seen from the foregoing description, according to this embodiment, by combining three isosceles triangular filters that have respectively different transmission and reflection wavelength ranges so that those filters are tilted and by arranging those filters in a regular triangular pyramid shape as their fundamental configuration, the incoming light can be split into three light rays with RGB components and can be used highly efficiently. In addition, by setting the tilt angles of the respective filters so as to satisfy Equations (3), (6) and (21), the light ray that has been reflected from each filter can be totally reflected from the interface 9. As a result, the RGB light rays can be taken in highly efficiently with the loss of the light minimized, which is very beneficial.

Although the tilt angles of the respective filters have not been described specifically in the foregoing description of embodiments, if the first and second transparent media 3 and 4 both have a refractive index of 1.5, then the angle w that satisfies Equations (3), (6) and (21) needs to fall within the range 20.9<w<35.3 degrees. If the angle w is set so as to satisfy this condition, then the light ray can be totally reflected from the interface 9 between the first transparent medium 3 and the air layer and the RGB light rays can be taken in highly efficiently. In addition, although the refractive indices n1 and n2 of the first and second transparent media 3 and 4 are supposed to be equal to each other in the foregoing description, their refractive indices are not necessarily the same. Alternatively, if the color separating filter array is designed so that n1<n2 is satisfied and that the light is incident on the photosensitive cells 2 as perfectly perpendicularly as possible, the incoming light can be taken in even more effectively.

Furthermore, even though all of those Equations (3), (6) and (21) are supposed to be satisfied in the foregoing description of embodiments, not all of these conditions need to be satisfied. Even if any of these conditions is satisfied imperfectly, the effects can still be achieved to a certain degree. Furthermore, in the embodiment described above, each unit element 1 of the color separating filter array is supposed to have a regular triangular pyramid shape and its three filters 1R, 1G and 1B are supposed to have an isosceles triangular shape. However, neither the unit element nor the filters need to have exactly such a shape. For example, there is no problem even if the unit element 1 has rounded corners or if the lengths of each filter's sides are not those of an isosceles triangle. Furthermore, in the embodiment described above, the interface 9 between the first transparent medium 3 and the air layer is supposed to have a planar shape. However, the effects can also be achieved to certain extent if the interface 9 is uneven only partially. Moreover, even though the medium on the light incident side of the color separating filter array is supposed to be the air in the embodiment described above, the air may be replaced with any other medium as long as the medium has a lower refractive index than the first transparent medium 1.

Furthermore, although the filters 1R, 1G and 1B that transmit R, G and B rays, respectively, are supposed to be used in the embodiment described above, these filters do not always have such transmission properties. For example, if the respective photosensitive cells 2 receive complementary color (Cy, Ye, Mg) rays and generate signals representing the respective color components of RGB through signal processing, then filters that transmit the complementary color rays and reflect primary color (R, G, B) rays may also be used.

Embodiment 2

Next, a second embodiment will be described. This second embodiment relates to an image capture device including the solid-state image sensor of the first embodiment.

Figure 3:
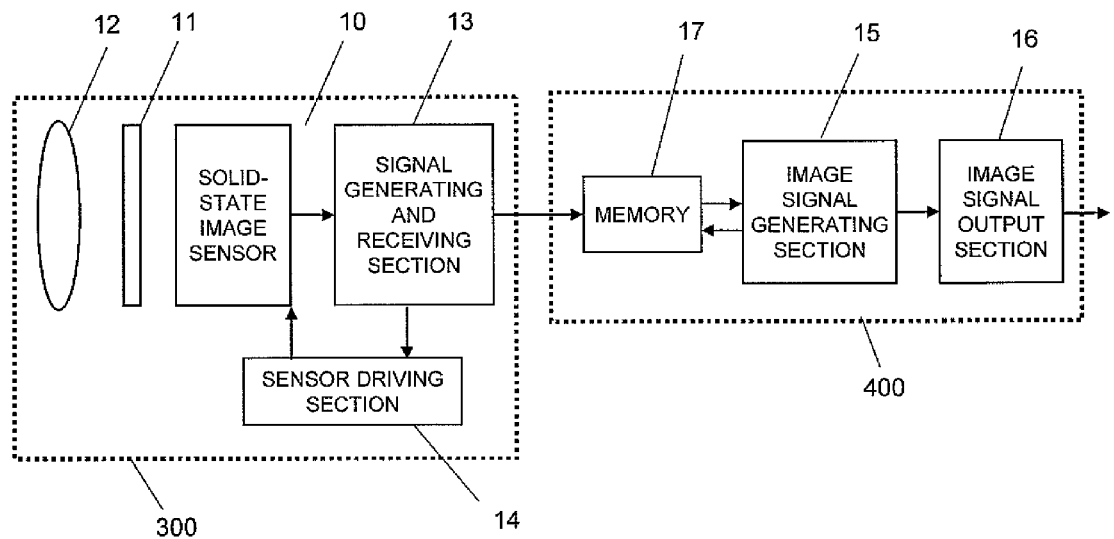
FIG. 3 A block diagram illustrating a configuration for an image capture device as a second exemplary embodiment.

FIG. 3 is a block diagram illustrating an overall configuration for an image capture device as a second embodiment. This image capture device is a digital electronic camera and includes an image capturing section 300 and a signal processing section 400 that generates a signal representing an image (i.e., an image signal) based on a signal supplied from the image capturing section 300.

The image capturing section 300 includes an optical lens 12 which images a given subject, an optical filter 11, and a solid-state image sensor (which will be referred to herein as an "image sensor") 10 which converts the optical information that has been gotten through the optical lens 12 and the optical filter 11 into an electrical signal by photoelectric conversion. The image capturing section 300 further includes a signal generating and receiving section 13, which not only generates a fundamental signal to drive the image sensor 10 but also receives the output signal of the image sensor 10 and sends it to the signal processing section 400, and a sensor driving section 14 which drives the image sensor 10 in accordance with the fundamental signal generated by the signal generating and receiving section 13. The optical lens 12 is a known lens and may be a lens unit including multiple lenses. The optical filters 11 are a combination of a quartz crystal low-pass filter which reduces a moiré pattern to be caused by a pixel arrangement with an infrared cut filter which filters out infrared rays. The image sensor 10 may be the image sensor of the first embodiment and is arranged so that its color separating filter array faces its photosensitive cell array. The image sensor 10 is typically a CMOS or CCD, and may be fabricated by known semiconductor device processing technologies. The signal generating and receiving section 13 and the sensor driving section 14 may be implemented as an LSI such as a CCD driver.

The signal processing section 400 includes an image signal generating section 15 which generates an image signal by processing the signal supplied from the image capturing section 300, a memory 17 which stores various kinds of data that have been produced while the image signal is being generated, and an image signal output section 16 which sends out the image signal thus generated to an external device. The image signal generating section 15 is suitably a combination of a hardware component such as a known digital signal processor (DSP) and a software program for use to perform image processing involving the image signal generation. The memory 17 may be a DRAM, for example. And the memory 17 not only stores the signal supplied from the image capturing section 300 but also temporarily retains the image data that has been generated by the image signal generating section 15 or compressed image data. These image data are then output to either a storage medium or a display section (neither is shown) by way of the image signal output section 16.

The image capture device of this preferred embodiment actually further includes an electronic shutter, a viewfinder, a power supply (or battery), a flashlight and other known components. However, description thereof will be omitted herein because none of them are essential components that would make it difficult to understand how the present invention works unless they were described in detail. It should also be noted that this configuration is just an example. Rather, the present invention may also be carried out as any other appropriate combination of known elements except the image sensor 10.

Figure 4:
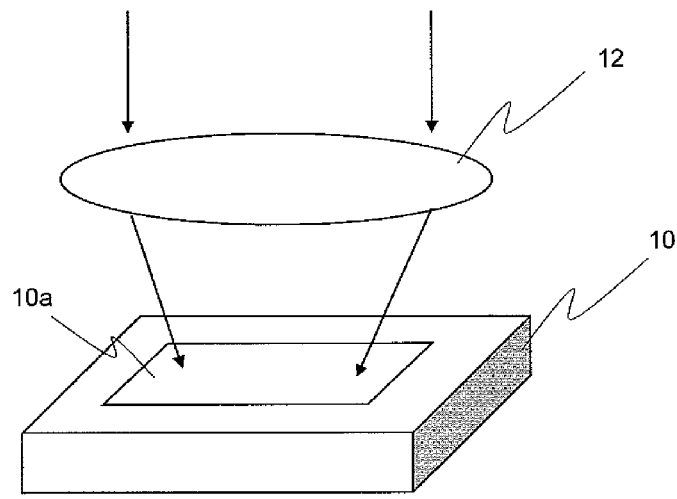
FIG. 4 A schematic representation illustrating a lens 12 and an image sensor 10 according to the second exemplary embodiment.

FIG. 4 schematically illustrates how the light that has been transmitted through the lens 12 is incident on the image sensor 10 during an exposure process. In FIG. 4, shown are only the lens 12 and the image sensor 10 with illustration of the other components omitted for the sake of simplicity. Also, although the lens 12 actually often consists of a number of lenses that are arranged in the optical axis direction, the lens 12 shown in FIG. 4 is illustrated as a single lens in a simplified form. On the image capturing plane 10a of the image sensor 10, arranged two-dimensionally are a number of photosensitive cells (pixels) 2 that form a photosensitive cell array. Those photosensitive cells are typically photodiodes, each of which outputs, as a pixel signal, a photoelectrically converted signal representing the intensity of the light received.

Figure 5:
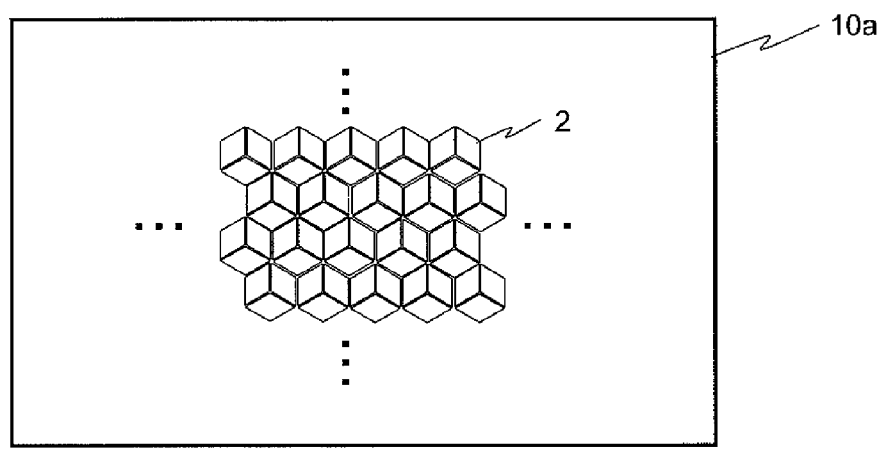
FIG. 5 Illustrates the arrangement of photosensitive cells 2 in the image sensor according to the second exemplary embodiment.

FIG. 5 is a plan view illustrating an exemplary arrangement of pixels. On the image capturing plane 10a, arranged two-dimensionally are a number of diamond shaped photosensitive cells. Although not shown in FIG. 5, a color separating filter array, including the red, green and blue filters 1R, 1G and 1B shown in FIG. 1A, is arranged so as to cover these photosensitive cells 2.

By adopting such a configuration, light that has been transmitted through the lens 12 and the optical filter 11 is incident on the image capturing plane 10a during an image capturing session, thereby producing a subject image there. The respective photosensitive cells 2 output photoelectrically converted signals representing the quantities of the light received by them. The photoelectrically converted signals are processed by the image signal generating section 15, thereby generating an image signal.

According to this embodiment, by using the color separating filter of the first embodiment, the incoming light can be split into three light rays with the RGB components and can be used effectively. Particularly when the tilt angles of the respective filters are set so as to satisfy Equations (3), (6) and (21) described above, the light reflected from those filters can be totally reflected from the interface 9. As a result, the RGB light rays can be taken in highly efficiently. Consequently, the sensitivity can be increased compared to existent ones.

Embodiment 3

Hereinafter, a third embodiment of the present invention will be described. In the embodiment to be described below, the color separating filter array is applied to a two-dimensional LCD panel.

Figure 6:
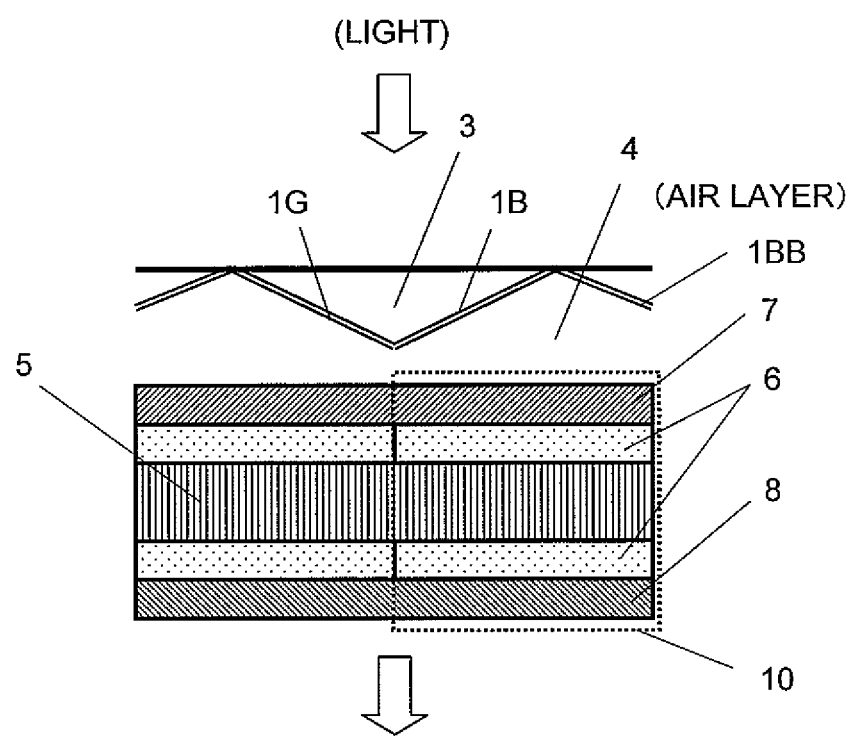
FIG. 6 A partial cross-sectional view of a display panel as a third exemplary embodiment.
Figure 7:
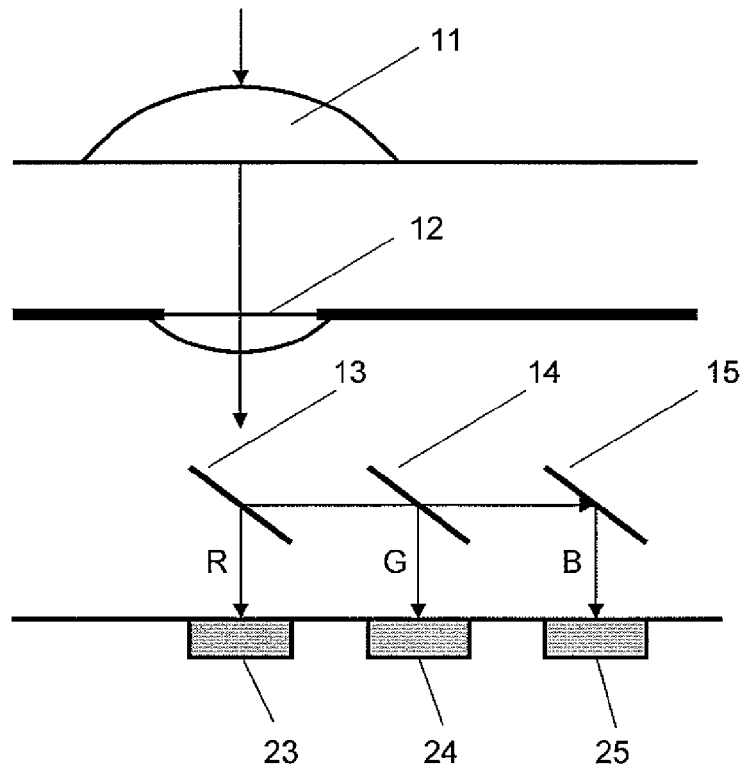
FIG. 7 A cross-sectional view illustrating a traditional solid-state image sensor that uses micro lenses and a multilayer filter.
Figure 8A:
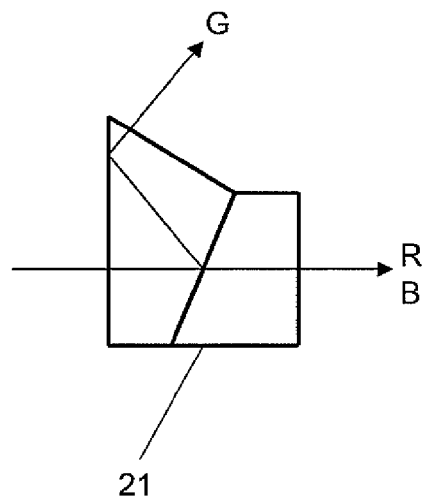
FIG. 8A Illustrates the shape of an optical prism for use in a traditional two-tube color camera.
Figure 8B:
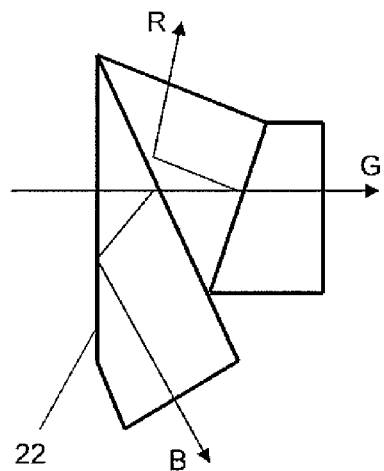
FIG. 8B Illustrates the shape of an optical prism for use in a traditional three-tube color camera.
Figure 9:
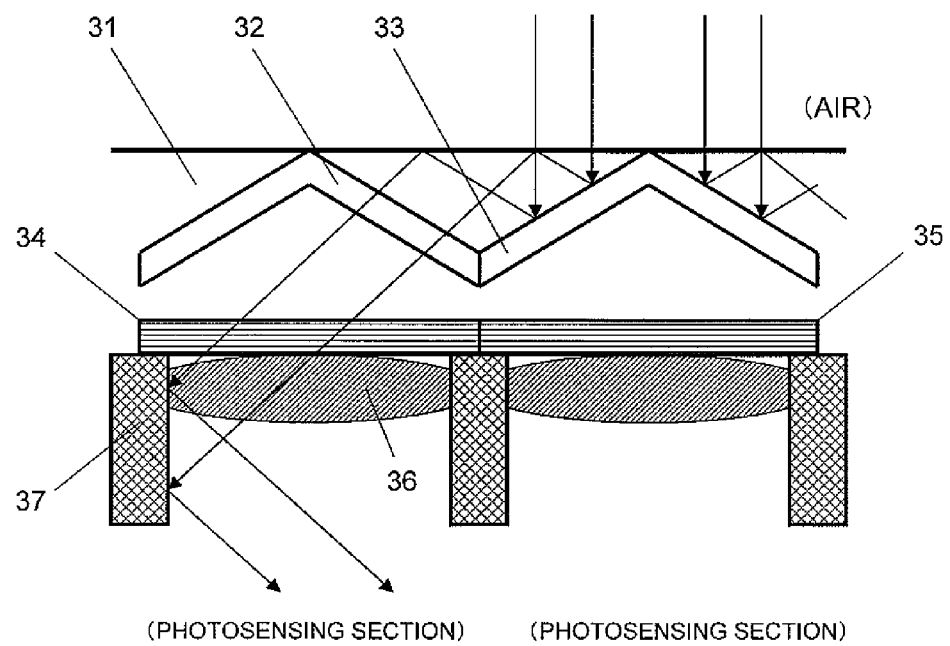
FIG. 9 A partial cross-sectional view of a traditional image sensor, of which the optical efficiency is increased by using a multilayer filter and reflections.

FIG. 6 is a partial cross-sectional view of an LCD panel according to this embodiment and corresponds to the cross-sectional view shown in FIG. 1B that illustrates the first embodiment. Since the color separating filter array of this embodiment is the same as that of the first embodiment, a detail description thereof will be omitted herein. In FIG. 6, the photosensitive cells 2 shown in FIG. 1B are replaced with a liquid crystal layer 5, transparent electrodes 6, a 0-degree polarizer 7 and a 90-degree polarizer 8, which together form a "display section 10" for a single pixel. Each display section 10 is provided for its associated unit element of the color separating filter array.

In this configuration, light comes from over the structure illustrated in FIG. 6 and is split by the color separating filter array into RGB light rays. A specific method for splitting the incoming light into these light rays is the same as what has already been described for the first embodiment, and description thereof will be omitted herein. The incoming light that has been split into the RGB light rays are incident on respective pixels of the LCD panel, passed through the 0-degree polarizer 7 and then have its intensity controlled by the transparent electrodes 6, the liquid crystal layer 5 and the 90-degree polarizer 8. In the related art, since an array of organic RGB filters is arranged instead of the color separating filter array of this embodiment, light rays not falling within the transmission wavelength range of a filter are absorbed into that filter. On the other hand, since a color separating filter array that does not absorb light is used according to this embodiment, the incoming light can be used highly efficiently.

As can be seen, since the color separating filter array is used in an LCD panel according to this embodiment, the incoming light can be used more efficiently than in the related art.

INDUSTRIAL APPLICABILITY

The color separating filter array of the present invention can be used effectively in every color camera that ever uses a solid-state image sensor, and may be used in so-called "digital cameras", "digital movies" and other consumer electronic cameras, solid-state cameras for broadcasting purposes, and industrial surveillance cameras, to name just a few. In addition, the color separating filter array can also be used in every color display panel such as a color LCD panel.

REFERENCE SIGNS LIST 1R, 1RR, 1G, 1GG, 1B, 1BB filter
2 image sensor's photosensitive cell
3 first transparent medium
4 second transparent medium
5 liquid crystal layer
6 transparent electrode
7 0-degree polarizer
8 90-degree polarizer
9 interface (reflective region)
10 display section
11 micro lens
12 inner lens
13 filter than reflects every light ray but red (R) ray
14 filter that reflects only green (G) ray
15 filter that reflects only blue (B) ray
21 optical prism for traditional two-tube color camera
22 optical prism for traditional three-tube color camera
31 light-transmitting resin
32 G-ray-transmitting multilayer filter
33 R-ray-transmitting multilayer filter
34 G-ray-transmitting color filter
35 R-ray-transmitting color filter
36 micro lens
37 metal layer

The invention claimed is:

1. A color separating filter array in which a plurality of unit elements, each having the shape of a triangular pyramid, are arranged two-dimensionally,
   each said unit element comprising:
   first, second, and third filters that are arranged to form the three lateral faces of the triangular pyramid and that have mutually different transmission wavelength ranges and reflection wavelength ranges; and
   a reflective region that is arranged to form a transverse face of the triangular pyramid and further reflect a light ray that has been incident on a region surrounded with the first, second and third filters and reflected from any of the first, second and third filters and to guide the reflected light ray to another one of the first, second and third filters that is different from the one that has already reflected the light ray once,
   the first filter being designed to transmit visible radiation falling within a first wavelength range and reflect visible radiation falling within any wavelength range other than the first wavelength range,
   the second filter being designed to transmit visible radiation falling within a second wavelength range and reflect visible radiation falling within any wavelength range other than the second wavelength range,
   the third filter being designed to transmit visible radiation falling within a third wavelength range and reflect visible radiation falling within any wavelength range other than the third wavelength range.

2. The color separating filter array of claim 1, wherein the reflective region is arranged so as to totally reflect the light ray that has been reflected from any of the first, second and third filters.

3. The color separating filter array of claim 1, wherein the first wavelength range is the color red wavelength range, the second wavelength range is the color green wavelength range, and the third wavelength range is the color blue wavelength range.

4. The color separating filter array of claim 1, wherein the reflective region and the first, second, and third filters are arranged so that part of the light ray that has been transmitted through the reflective region and then reflected from any of the first, second and third filters is reflected from the reflective region, further reflected from a different one of the first, second and third filter other than the filter that has already reflected the light ray, once again reflected from the reflective region, and then incident on one of the first, second and third filters that has the property of transmitting the light ray.

5. The color separating filter array of claim 1, wherein if the refractive index of a medium that is surrounded with the first, second and third filters and the reflective region with respect to another medium that contacts with the former medium via the reflective region is n and if the angle defined by each of the first, second and third filters with respect to the reflective region is w, the filter array satisfies at least one of the three inequalities:

$$\frac{1}{2}\sin^{-1}\left(\frac{1}{n}\right) < w, \ w < \tan^{-1}\left(\frac{1}{\sqrt{2}}\right), \text{ and } w < \sin^{-1}\left(\left(\frac{\sqrt{n^2-1}}{n}\right)^{\frac{1}{4}}\right).$$

6. The color separating filter array of claim 5, wherein the filter array satisfies all of the three inequalities:

$$\frac{1}{2}\sin^{-1}\left(\frac{1}{n}\right) < w, \ w < \tan^{-1}\left(\frac{1}{\sqrt{2}}\right), \text{ and } w < \sin^{-1}\left(\left(\frac{\sqrt{n^2-1}}{n}\right)^{\frac{1}{4}}\right).$$

7. The color separating filter array of claim 1, wherein the plurality of unit elements are arranged so that the first, second and third filters of each said unit element are respectively adjacent to the first, second and third filters of an adjacent one of the unit elements.

8. A solid-state image sensor comprising:
the color separating filter array of claim 1; and
a plurality of photosensitive cells that are arranged opposite from the reflective region with respect to the first, second and third filters of each said unit element.

9. An image capture device comprising:
the solid-state image sensor of claim 8;
an optical system that produces an image on an image capturing plane of the solid-state image sensor; and
a signal processing section that processes the output signal of the solid-state image sensor.

10. A display device comprising:
the color separating filter array of claim 1; and
a plurality of display sections that are arranged opposite from the reflective region with respect to the first, second and third filters of each said unit element.

* * * * *